(12) United States Patent
Chandhok et al.

(10) Patent No.: US 7,266,519 B2
(45) Date of Patent: Sep. 4, 2007

(54) BILLING SYSTEM WITH AUTHENTICATED WIRELESS DEVICE TRANSACTION EVENT DATA

(75) Inventors: Ravinder Chandhok, Poway, CA (US); Brian Minear, San Diego, CA (US); Jun Yamada, Yokohama (JP); Richard Wayne Gardner, III, Rancho Sante Fe, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 10/610,439

(22) Filed: Jun. 30, 2003

(65) Prior Publication Data
US 2004/0267646 A1 Dec. 30, 2004

(51) Int. Cl.
*G07F 19/00* (2006.01)

(52) U.S. Cl. ........................................ 705/34
(58) Field of Classification Search .............. 705/34, 705/30, 29, 40, 44; 455/3.01; 713/166, 713/170
See application file for complete search history.

(56) References Cited

U.S. PATENT DOCUMENTS

| 6,073,124 | A  | * | 6/2000  | Krishnan et al. ............. 705/59 |
| 2001/0034677 | A1 | * | 10/2001 | Farhat et al. ................. 705/30 |
| 2001/0034693 | A1 | * | 10/2001 | Farhat et al. ................. 705/37 |
| 2001/0034704 | A1 | * | 10/2001 | Farhat et al. ................. 705/39 |
| 2004/0043753 | A1 | * | 3/2004  | Wake et al. ................. 455/406 |
| 2004/0068650 | A1 | * | 4/2004  | Resnitzky et al. .......... 713/155 |
| 2004/0224661 | A1 | * | 11/2004 | Pericas et al. .............. 455/406 |

* cited by examiner

*Primary Examiner*—Ronald Laneau
(74) *Attorney, Agent, or Firm*—Robert J. O'Connell

(57) ABSTRACT

A system, method, and computer program for billing wireless device subscribers based upon billable interaction with applications and services resident on third party computer devices that are accessible through a wireless network. The system uses authenticatable transaction data that is created when a wireless device conducts a billable transaction whereby the data is a secure indication that a wireless device has performed a specific billable transaction event. The transaction data can be authenticated and then aggregated to generate billing for billable transaction events that occur on the wireless network. The billing can occur from a billing computer on the network or the aggregated data can be sent to a wireless service provider for ultimate billing to the wireless device subscriber.

37 Claims, 5 Drawing Sheets

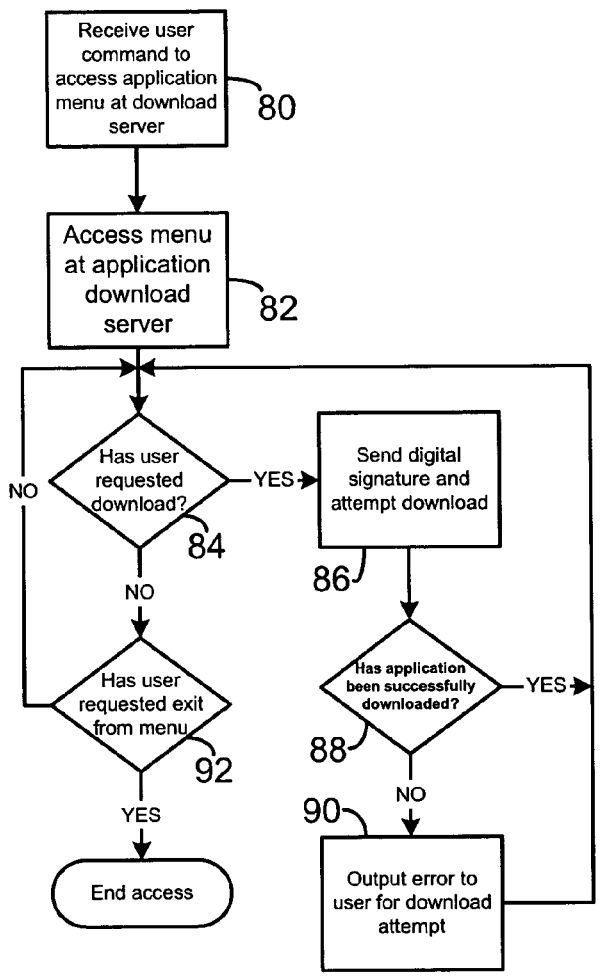
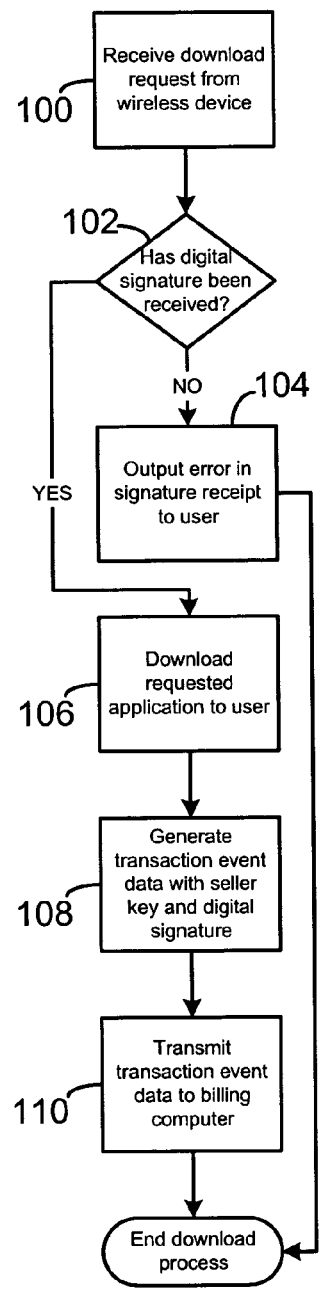
Fig. 5
Fig. 6

BILLING SYSTEM WITH AUTHENTICATED WIRELESS DEVICE TRANSACTION EVENT DATA

BACKGROUND OF THE INVENTION

1. Field of the Invention

The present invention generally relates to wireless devices and wireless networks. More particularly, the invention relates to a system and method that permits accurate and reliable transaction data for third party application sales and services to wireless telecommunication devices across a wireless network, and can provide accurate data sufficient to bill wireless service subscribers for the billable transactions.

2. Description of the Related Art

Wireless devices, such as cellular telephones, communicate packets including voice and data over a wireless network. In existing wireless telecommunication systems, such as cellular telecommunication systems, fees are typically charged by a wireless network provider to a wireless service subscriber for the initial activation of a telecommunication device and then fees can be charged for ongoing airtime and device usage. However, existing wireless network systems, such as cellular networks, typically do not account for other activities at the telecommunication device beyond airtime usage.

If the subscriber of the wireless device desires to download and use a software application or upgrade the functionality of the wireless device, the subscriber will typically either call a service provider or contact the service provider through another electronic means, such as through a separate Internet access. In some instances, the service provider can transmit the application to the wireless device across the wireless network (through a one time direct access download) or allow the user access a network site within the wireless device through the wireless network, and at such site the application is downloadable or accessible to the wireless device. The access of the wireless device to the application most typically occurs through a secure-socket layer (SSL) or other secure data link. Otherwise, service personnel of the provider must have physical access to the telecommunication device to install the software or upgrade the components thereof.

The existing systems for monitoring and billing for wireless telecommunication device activity thus do not allow a service provider to bill or account for activities by the wireless device that not occur on the computer devices of that provider, and which are not accomplished through a secure data link. Further, the wireless device provider does not have a method to reliably bill its subscribers for any service provided to its subscribers through a third party solely across the wireless network without some manner of direct communication between the provider and the third party. Accordingly, the present invention is primarily directed to a system and method that allows the billing for wireless device billable transaction events that occur on the wireless network from the wireless devices of the subscribers interacting with other computer devices on the wireless network.

SUMMARY OF THE INVENTION

The present invention is a system, method, and computer program that utilizes gathered authenticatable data to bill wireless device subscribers for any billable interaction with applications and services resident on third party computer devices that are accessible through a wireless network, such as a cellular telecommunication network. The system uses authenticated transaction data that is created when a wireless device conducts a billable transaction, such as an application download or service subscription, whereby the data is a secure indication that a wireless device has performed a specific billable transaction event. The transaction data is aggregated to generate reliable billing data for billable transaction events, and the billing data can be gathered and billed from a billing computer on the network, or the billing data can be sent to a wireless service provider for billing to the wireless device subscriber.

In one embodiment, the system includes the wireless network supporting at least data communication thereacross, and one or more wireless computer devices are in selective communication with other computer devices across the wireless network. Each wireless device has the ability to conduct billable transactions with the other computer devices and the occurrence of a billable transaction causes authenticatable transaction event data to be generated through which it can be verified that a specific wireless device has performed a specific transaction event. At least one billing computer is in selective communication with the wireless network and gathers at least some of the transaction event data for the wireless devices and authenticates and aggregates the transaction event data into transaction event billing data whereby each transaction event is billable to the specific wireless device that effected that transaction event. The billing computer can either send a bill to the wireless device subscriber or send the billing data to another entity, such as wireless service provider, to enable the other entity to bill for the transaction events.

The method for utilizing authenticated transaction data to generate billing for wireless devices conducting transactions across a wireless network includes the steps of causing a billable transaction event to occur on the wireless network through the wireless computer device interacting with another computer device across the wireless network, and then generating authenticatable transaction event data through which it can be verified that the specific wireless devices has performed the specific transaction event. Finally, the method includes the step of aggregating the authenticated transaction event data into transaction event billing data such that each transaction event is billable to the specific wireless device that effected that transaction event. The method can further include the step of transmitting a bill directly to the wireless device subscriber for the transaction events caused by the wireless device, or the transaction event billing data can be transmitted to another device on the network.

The system and method accordingly give wireless service providers the ability to reliably bill for wireless telecommunication device transactions, such as application download and execution, that occur solely on the wireless network with third party computer devices. Through use of the system, the wireless service provider has an advantage in that the provider can give wireless airtime subscribers access to additional value-added services of third parties and effectively bill and capture the revenue from the third party services. Moreover, the billing system does not require that the subscriber contact the service provider or the third party outside of the computing environment in order to receive or access the additional service.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

FIG. 5 is a flowchart illustrating one embodiment of the process or subprocess executing on the wireless device computer platform that seeks to download an application (a billable transaction event) and uses a digital signature to verify the identity of the wireless device that makes the download.

FIG. 6 is a flowchart illustrating one embodiment of the process or subprocess executing on the computer platform of the third party computer application download server wherein the digital signature of the wireless device that downloads an application therefrom is gathered, and authenticatable transaction event data is generated and transmitted at the completion of the download.

DETAILED DESCRIPTION OF THE INVENTION

Figure 1:
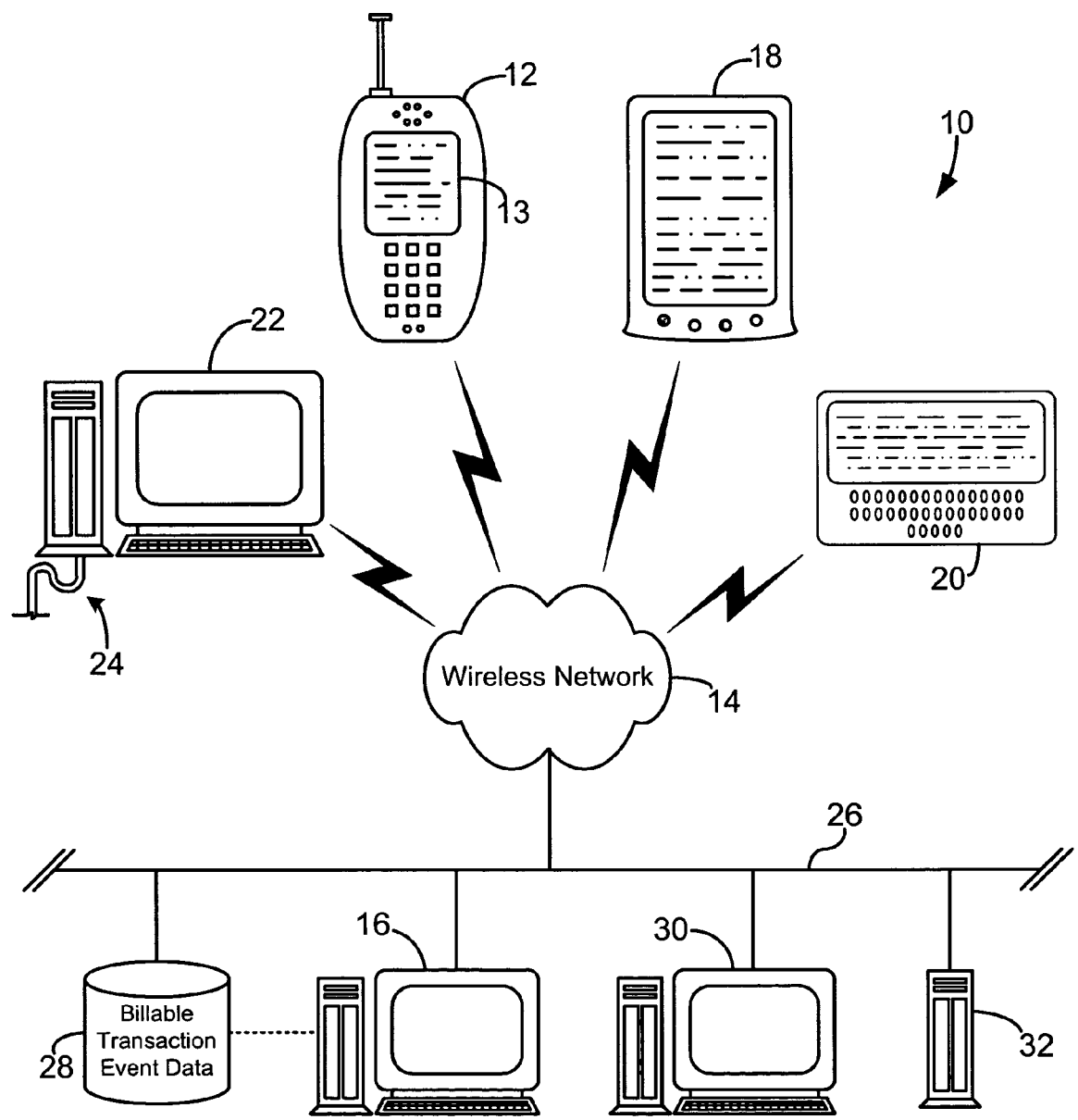
FIG. 1 is a representative diagram of a wireless network and the computer hardware and wireless devices that can be used within the billing system utilizing authenticated transaction event data for wireless device transactions.

With reference to the figures in which like numerals represent like elements throughout, FIG. 1 illustrates one embodiment of the present inventive system 10 for tracking authenticatable billable events occurring through wireless devices, such as cellular telephone 12, in communication across a wireless network 14, with third party computer devices, such as a third party application download server 16, that selectively downloads software applications or other data to the wireless devices across a wireless communication portal or other data access to the wireless network 14. In developing wireless networks 14, if the end-user of the wireless device desires to download and use a software application, the end-user will attempt to connect to an application download server, either the carrier's server or a third party application download server 16, through bridging a communication connection to the wireless network 14, and attempt to access and download the desired software application. Once the wireless device contacts the application download server 16, an initial contact is made and the application download server 16 can determine what applications and data are available to that wireless device 12,18, 20,22 and send the appropriate information, such as a menu (FIG. 3), for display on the wireless device 12,18,20,22 so the user at the wireless device can learn of the available applications and services.

As shown here, the wireless device can be a cellular telephone 12, with a graphics display 13, a personal digital assistant 18, a pager 20 with a graphics display, which is shown here as a two-way text pager, or even a separate computer platform 22 that has a wireless communication portal, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof. Further, the term "application" as used herein is intended to encompass executable and nonexecutable software files, raw data, aggregated data, patches, and other code segments.

In the system 10, one or more wireless devices 12,18,20, 22 are in selective communication with other computer devices across the wireless network 14, such as through a voice or data call between devices. Each wireless device has the ability to conduct billable transactions with other computer devices, such as an application download, execution, service or other value-added interaction, and the occurrence of a billable transaction causes authenticatable transaction event data 74 (FIG. 4) to be generated which permits the verification that a specific wireless device 12,18,20,22 has performed a specific transaction event. At least one billing computer 30 can be in selective communication with the wireless network 14 to gather at least some of the authenticatable transaction event data for the wireless devices, and the billing computer 30 can also authenticate and aggregate the transaction event data into transaction event billing data such that each transaction event is billable to the specific wireless device that effected that transaction event. As is more fully described herein, the billing computer 30 can generate bills to the wireless service subscriber for the wireless device that caused a billable transaction event, or the transaction event billing data can be transmitted to another computer device on the wireless network 14 or a local network 26, such as a third party billing computer 32, which is typically a wireless service provider.

The one or more wireless devices 12,18,20,22, typically at the direction of an end-user operating the device, selectively communicate with other computer devices across a wireless network, application download server 16, which can partially exist on a local server-side network 26 with other computer elements in communication with the wireless network 14, such as a billable transaction event database 28 that can contain either authenticated or non-authenticated transaction event data for the wireless devices. All of the components can work in tandem to gather data relative to billable transaction events of the wireless devices 12,18,20, 22 and aggregate the transaction event data at the billing computer 30 as is further described herein. However, it should be noted that all server-side functions can be performed on one server, such as billing computer 30. Further, any computer or server-side computer platform can provide separate services and processes to the wireless devices 12,18,20,22 across the wireless network 14.

Figure 2:
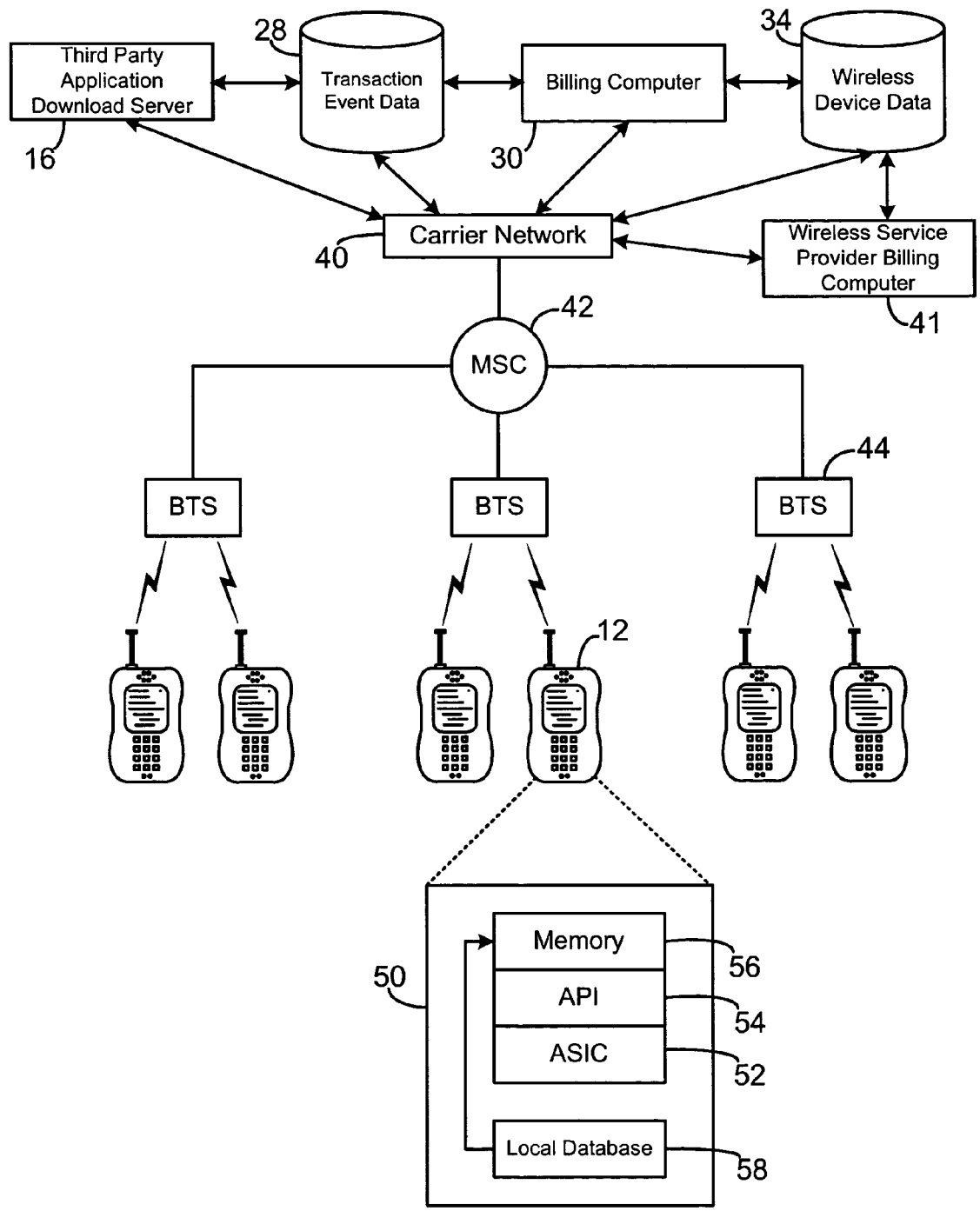
FIG. 2 is a block diagram illustrating a cellular telecommunication network with the billing system tracking billable transaction events occurring on wireless devices that interact with other computer devices across the wireless network.

FIG. 2 is a block diagram that more fully illustrates the components of the wireless network 14 and interrelation of the elements of the system 10. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. The server side components are a billing server 16, third party application download server 16, a billable transaction event database 28, a billing computer 30, a wireless device database 34, and a wireless service provider billing computer 41. Other server-side components will be present on the cellular data network with any other components that are needed to provide cellular telecommunication services. The server-side components as embodied in FIG. 2 can by themselves create a billing system 10 solely through tracking applications downloaded from the third party application download server 16 and the billing for the download will be generated (and authenticated) through correlation of the billable transaction event database 28 and wireless device database 34 by the billing computer 30. The system 10 can also transmit transaction event billing data to a wireless service provider billing computer 41 that can gather wireless device data, such as from database 34, and generate billing to the wireless service subscribers of that provider. With the use of third party hardware readily scalable, the number of computer devices that can be made accessible to the wireless devices is theoretically unlimited.

The server-side components communicate with a carrier network 40 through a data link, such as the Internet, a secure LAN, WAN, or other network. The carrier network 40 controls messages (generally in the form of data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes, among other components, an application-specific integrated circuit ("ASIC") 52, or other processor, microprocessor, logic circuit, programmable gate array, or other data processing device. The ASIC 52 is installed at the time of manufacture of the wireless device and is not normally upgradeable. The ASIC 52 or other processor executes an application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications not actively used in memory 56, such as the software applications downloaded from the third party application download server 16. The local database 58 is typically comprised of one or more flash memory cells, but can be any secondary or tertiary storage device as known in the art, such as magnetic media, EPROM, EEPROM, optical media, tape, or soft or hard disk.

Cellular telephones and telecommunication devices, such as cellular telephone 12, are being manufactured with increased computing capabilities and are becoming tantamount to personal computers and hand-held personal digital assistants ("PDAs"). These "smart" cellular telephones allow software developers to create software applications that are downloadable and executable on the processor, such as ASIC 52, of the cellular device. The wireless device, such as cellular telephone 12, can download many types of applications, such as games and stock monitors, or simply data such as news and sports-related data. The downloaded data or executed applications can be immediately displayed on the display 13 or stored in the local database 58 when not in use. The software applications can be treated as a regular software application resident on the wireless device 12,18,20,22, and the user can selectively upload stored resident applications from the local database 58 to memory 56 for execution on the API 54. The user of the wireless device 12,18,20,22 can also selectively delete a software application from the local database 58. As a result, end-users of cellular telephones 12 can customize their telephones with programs, such as games, printed media, stock updates, news, or any other type of information or program available for download from application download servers through the wireless network 14.

The use of these value-added services of third parties by the wireless device 12,18,20,22 cause billable transaction events for which the wireless network service provider will bill the subscriber of the wireless device, who is not necessarily the end-user of the wireless device at the time of the billable event. The billable events typically occur from the end-user conducting some activity with applications provided from the third party application download server 30. Examples of billable events include, but are not to be limited to, downloading an application from a third party application download server 16 on the wireless network 14 to the wireless device computer platform 50, the execution of an application on the wireless device 12,18,20,22; accessing an application resident on another computer device on the wireless network 14, such as application download server 16, or an accessible database, or other parameter of execution or interaction therewith.

The system 10 accordingly allows a third party, such as an independent software vendor or developer, either through the third parties own computer devices or through a network carrier 40, to provide software applications as downloadable to the wireless device. A multitude of computer devices can be involved in the ultimate delivery of applications and services, and the wireless device 12,18,20,22 can make several accesses to one or more third party computer devices. The system 10 can thus after-bill the carrier 40 for their subscriber billable event transactions, which typical is a different fee than what the carrier 40 will use to bill their subscribers, and the billing computer 30 can aggregate and generate the transaction event billing data and can provide the data to the wireless service provider.

Figure 3:
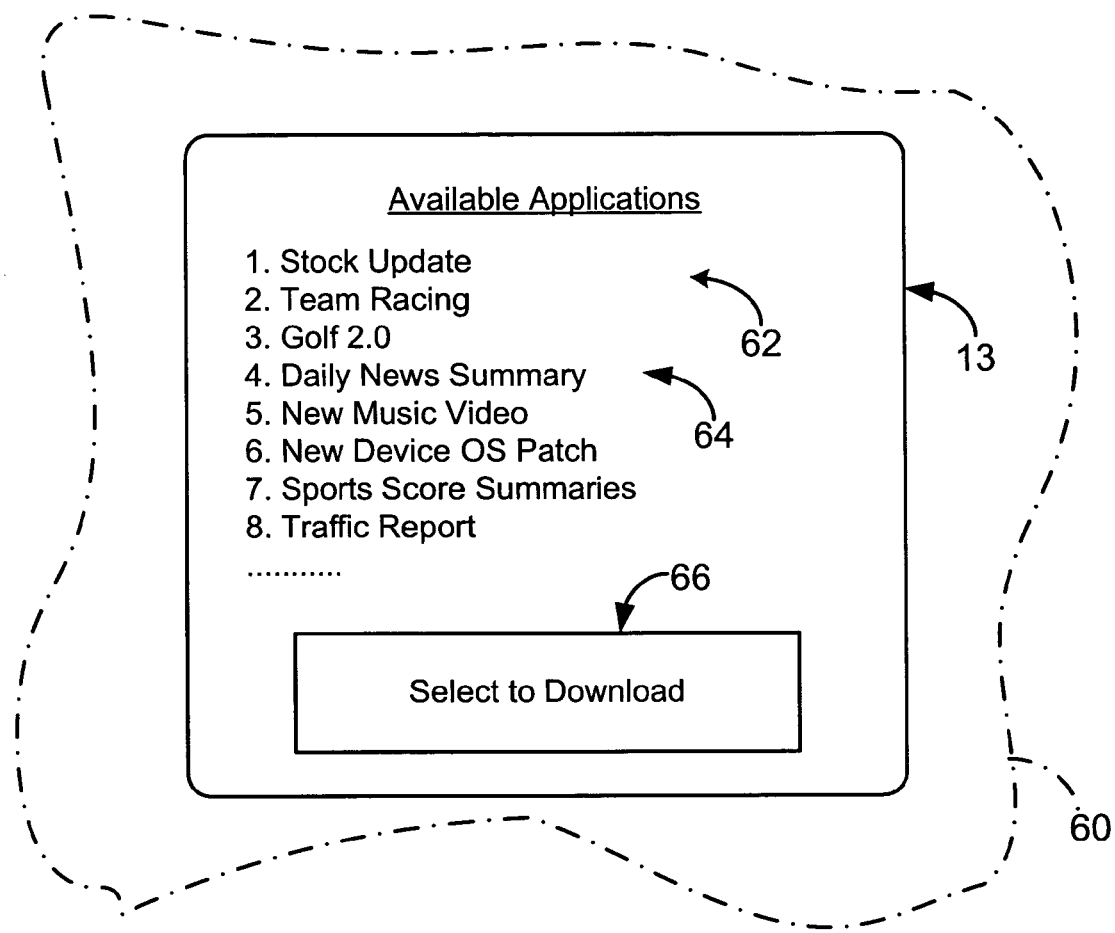
FIG. 3 is an interactive menu that is presented to the users of the wireless devices when contacting a third party application download server across the wireless network, and a plurality of options for interaction is represented on the display.

To illustrate the possible services provided from the third party application download server 30 to the wireless devices 12,18,20,22, FIG. 3 is a partial view 60 of the display 13 having an menu 62 displayed thereon listing potential interactions with the application download server 16. Simple data for display at the wireless device is shown in an available news section 64, wherein the wireless device will pay for simple access to the data. The wireless devices 12,18,20,22, can therefore select to download an application from the menu, as shown at selection site 66, which will cause a from the third party application download server 16 is shown. The subscriber for the wireless device (end-user or not) will be discretely billed if one or more of the applications are downloaded.

In one embodiment of the system 10, the billable transaction event data for the one or more wireless devices 12,18,20,22 is ultimately gathered at billing computer 30 such that the billing information for each wireless device that the billing computer accounts for is contained at the billing computer 30. As embodied in FIG. 2, the billing information will ultimately be provided to the carrier network 40 to the wireless service provider billing computer 41 for billing to the carrier's subscriber. However, the billing computer 30 itself can generate a bill to the wireless device subscriber, for whom it can access the information of the wireless device data 34. While the billable event data is ultimately gathered at the billing computer 30, the third party computer device (application download server 16) can also gather the billable event data and transmit it periodically to the billing computer 30. The third party computer device can transmit billable transaction event data to the billing computer 30 at the completion of the billable transaction event, upon query from the billing computer 30, or at a predetermined interval of time, e.g. every 30 minutes while active. And if the billing computer 30 further generates a bill for a wireless device 12,18,20,22 based upon the gathered billable event data, the generated bill can be transmitted from the billing computer to another computer device on the wireless network 14. It should also be noted that the transaction event data (authenticated or not) can thus be stored at any computer device on the network, such as the application download server 16, and then ultimately transmitted to the billing computer 30.

Figure 4:
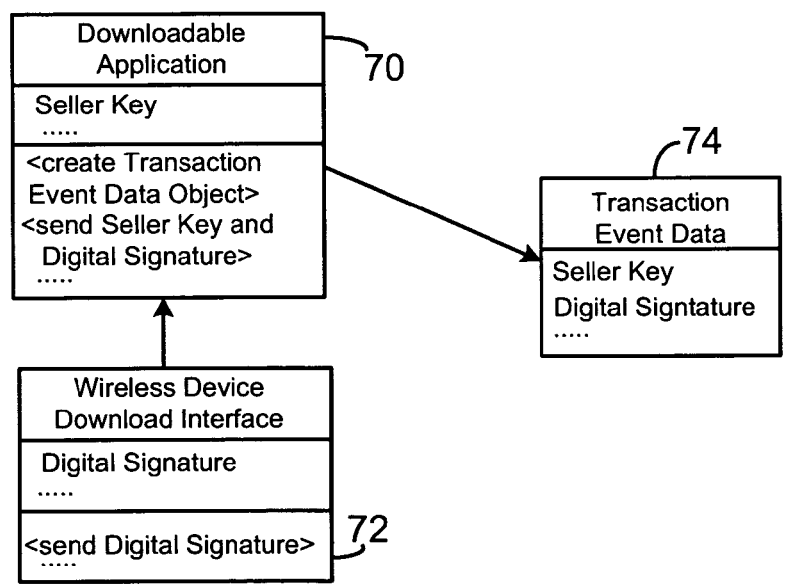
FIG. 4 is an object diagram illustrating an embodiment of the system wherein the formation of an authenticatable transaction event data object occurs from interaction between the downloadable application and the wireless device download interface.

FIG. 4 is an object diagram illustrating the downloadable application 70 creating the authenticatable transaction event data object 74 from interaction with the wireless device download interface 72. The downloadable application includes at least as data a seller key, and as methods a "create authenticated transaction event object" and a "send seller key and digital signature." And the wireless device download interface 72 includes as data a digital signature, or other identification data such as an encryption key or other unique data as known in the art, and a method to "send the digital signature." Thus, when the wireless device download interface 72 interacts with the downloadable application 70 to effect a download of the application, which is a billable transaction event to the wireless device 12,18,20,22, the digital signature is sent to the downloadable application object 70 and the downloadable application 70 creates the transaction event data object 74 and then populates the transaction event data object 74 with the seller key and digital signature whereby the transaction event data object 74 can be authenticated with the unique data of the seller of the application and the purchasing wireless device. It should be noted that the wireless device download interface 72 can contain the method to create the transaction event data object 74, or share such a method with the downloadable application 70 as would be known to one of skill in the art.

In sum, as embodied in FIG. 4, in an object-oriented paradigm, the downloaded application 70 creates a software object of the transaction event data 74 comprised of authenticatable transaction data for wireless devices 12,18,20,22 conducting transactions across a wireless network 14, where the object verifies that a specific wireless device has performed a specific billable transaction event such that the object is utilizable to generate billing for billable transaction events that occur on the wireless network 14. The transaction event data 74 can be transmittable to the billing computer 30 in selective communication with the wireless network, and can be resident on within the downloadable application 70, or the wireless device download interface 72 or both. Further, the transaction event data 74 can be created upon an application download, or the wireless device effecting a subscription to a service provided by one or more computer devices to the wireless computer device across the wireless network 14. Further, the transaction event data 74 can modified after the creation at the occurrence of a transaction event, FIG. 5 is a flowchart illustrating one embodiment of the process or subprocess executing on the wireless device computer platform 50 where the user seeks to download an application (a billable transaction event) and the digital signature of the wireless device 12,18,20,22 is used to verify the identity of the wireless device 12,18,20,22. The wireless device computer platform 50 receives a command to access the application menu 62 of the application download server 16, as shown at step 80, and then the computer platform 50 accesses the menu 60 as shown at step 82. A determination is then made as to whether the user has request a download, as shown at decision 84. If a request for a download has occurred at decision 84, the digital signature is sent to the application download server 16 and an attempt to download the application is made, as shown at step 86, and then a determination is made as to whether the application has been successfully downloaded as shown at decision 88. If the application has been successfully downloaded at decision 88, then process returns to decision 84 to determine if another application download has been requested. If the application has not been successfully downloaded at decision 88, an error is output to the user that attempted to download the application, as shown at step 90, and then the process returns again to decision 84.

If the user has not requested the download of an application at decision 84, a determination is made as to whether the user has requested to exit the menu, as shown at decision 92. If the user has not requested to exit from the menu at decision 92, the process returns to decision 84 and iterates decision 84 to determine if a download has been requested, and decision 92 to determine if menu exit has been requested. If the user requested menu exit at decision 92, the access of the wireless device 12,18,20,22 to the menu of the application download server 16 is ended.

FIG. 6 is a flowchart illustrating one embodiment of the process or subprocess executing on the third party computer application download server 16 wherein the digital signature of the wireless device that downloads an application therefrom is gathered, and transaction event data is generated, as shown in FIG. 4, and transmitted at the completion of the download. A download request is received from a wireless device 12,18,20,22 as shown at step 100, and a determination is made as to whether the digital signature of the wireless device 102 has been received as shown at decision 102. If the digital signature has not been received at decision 102, an error is output to the user for failure to receive digital signature and authenticate the user, as shown at step 104 and the download process is ended. Otherwise, if the digital signature is received at decision 102, the requested application is downloaded to the wireless device of the user as shown at step 106, and then the transaction event data is generated containing a the seller key and digital signature, as shown step 108, and further illustrated in FIG. 4. The transaction event data is then transmitted to the billing computer 30 as shown at step 110 and the download process ends.

The process can be alternately embodied such that the transaction event generation process (step 108) is performed on another computer on the wireless network 14. Further, the transaction event data can be transmitted to one or more other computers on the wireless network 14, instead of solely the billing computer 30.

Figure 7:
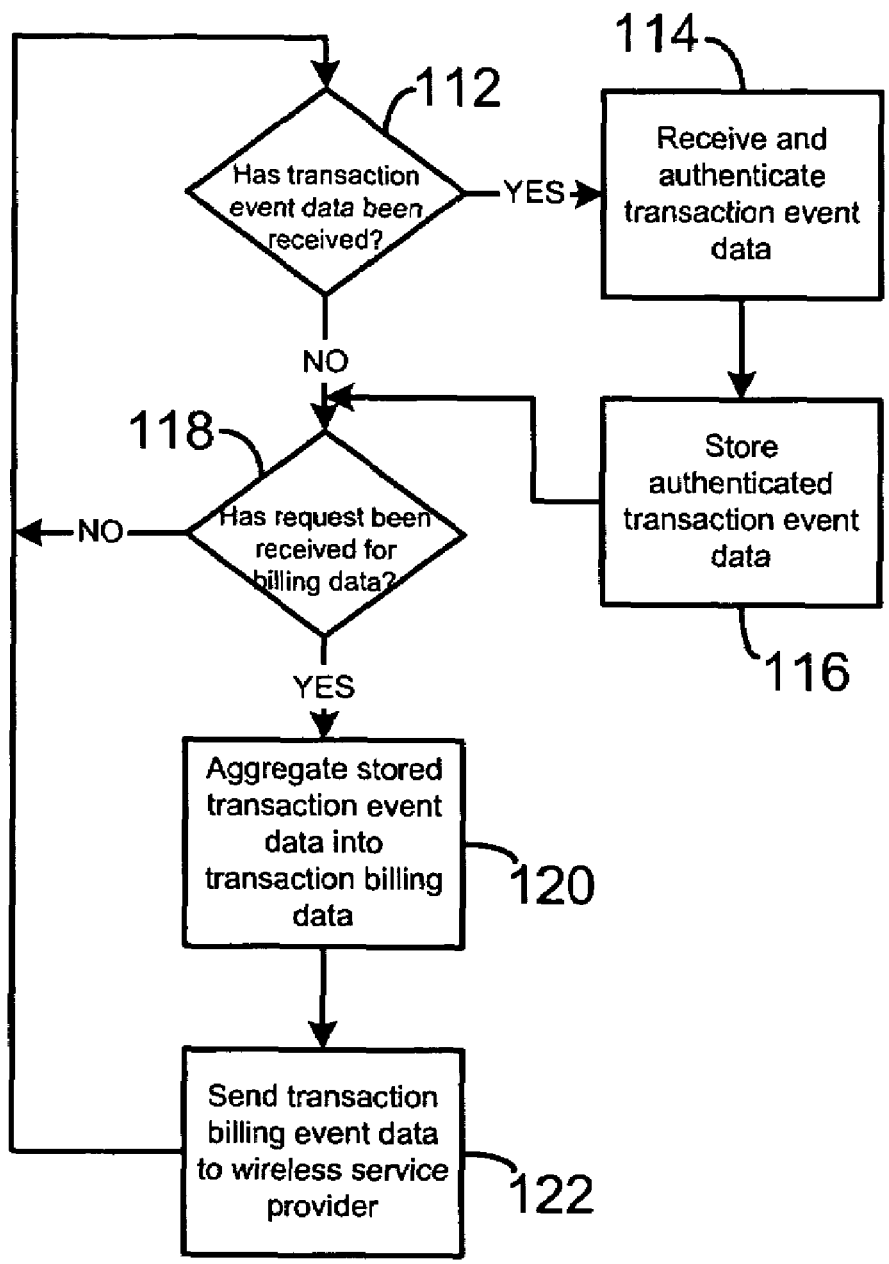
FIG. 7 is a flowchart illustrating one embodiment of the process or subprocess executing on a billing computer that receives, authenticates, and stores transaction event data from the wireless network and aggregates and sends transaction event billing data to a wireless service provider upon request.

FIG. 7 is a flowchart illustrating one embodiment of the process or subprocess executing on a billing computer 30 that receives, authenticates, and stores transaction event data 74 from the wireless network 14, and aggregates and sends transaction event billing data 74 to a wireless service provider billing computer 41 upon request. The process is entered through a determination as to whether transaction event data 74 has been received from the one or more wireless devices 12,18,20,22, as shown at decision 118. If transaction event data 74 has been received at decision 112, the transaction event data 74 is received and authenticated as shown at step 114. The authentication occurs, in one embodiment, from the verification of the seller key and digital signature of the wireless device 12,18,20,22. However, other methods of identity verification, such as PGP or other encryption key technology, can be used in the present system as would be known to one of skill in the art. After authentication of the transaction event data 74, the authenticated data is stored, as shown at step 116. Then the process continues to decision 118, which is also reached if there was no transaction event data 74 at decision 112, wherein a determination is made as to whether a request has been received to transmit transaction billing data to a wireless service provider billing computer 41. If a request to transmit the transaction billing data has not been received at decision 118, the process returns to decision 112 and thus enters a wait-state and constantly determining if transaction data and a transaction billing data transmission request has been made.

Otherwise, if transaction event billing data transmission has been requested at decision 118, then the stored authenticated transaction data is aggregated into transaction event billing data, as shown at step 120, and then the transaction event billing data is sent to the wireless service provider billing computer 41, as shown at step 122. Alternately, billing for the wireless devices 12,18,20,22 can be generated at step 120 and then sent to the wireless devices 12,18,20,22 themselves, transmitted to another computer such as a wireless service provider computer 41, or the transaction billing data can be converted into actual printed bills for mailing to the wireless service subscriber for the wireless devices 12,18,20,22.

It can be seen that the system 10 thus provides a method for utilizing authenticated transaction data to generate billing for wireless devices 12,18,20,22 conducting transactions across a wireless network 14 supporting at least data communication thereacross, having the steps of causing a billable transaction event to occur on the wireless network 14 through a wireless computer device interacting with another computer device across the wireless network 14, generating authenticatable transaction event data 74 that is usable to verify that the specific wireless device has performed the specific transaction event, authenticating the transaction event data, and then aggregating the transaction event authentication data 74 into transaction event billing data such that each transaction event is billable to the specific wireless device 12,18,20,22 that effected that transaction event The step of aggregating the authenticated transaction event data can occur at a billing computer 30 in selective communication with the wireless network 14. The method can also have the step of billing the wireless device subscriber for the transaction events caused by their wireless device(s).

The method can be embodied so as to include the step of generating a bill to the subscriber of each wireless computer device 12,18,20,22 based upon the authenticated and aggregated transaction event authentication data. The method can also include the steps of generating transaction event billing data based upon the authenticated transaction event data 74, and transmitting the transaction event billing data to a service provider, such as wireless service provider billing computer 41. The step of causing a billable transaction event can be downloading an application to the wireless computer device 12,18,20,22 from another computer device across the wireless network, as described in FIGS. 5 and 6. Alternately, the step of causing a billable transaction event can be effecting a subscription to a service provided by one or more computer devices to the wireless computer device 12,18,20, 22 across the wireless network 14. The step of generating authenticatable transaction event data can be generating authenticatable transaction event data from the downloadable application 70, as shown in FIG. 4, and if the wireless computer device includes a digital signature and the application has a secure key, and the step of generating authenticatable transaction event data is forming the transaction event data from the digital signature and secure key, as is also shown in FIG. 4. Moreover, the step of aggregating the authenticated transaction event data into transaction event billing data can occurs at the time of the transaction event occurrence, or alternately, the method can include the steps of storing the transaction event data 74 (authenticated or not), and transmitting the stored transaction event data to another computer device on the wireless network 14, such as wireless service provider billing computer 41.

In view of the method being executable on the computer platform of a computer device such as billing computer 30, the present system includes a program resident in a computer readable medium, where the program directs a server or other computer device having a computer platform to perform the steps of the method. The computer readable medium can be the memory of the billing computer 30, or can be in a connective database, such as billable transaction event database 28. Further, the computer readable medium can be in a secondary storage media that is loadable onto a wireless device computer platform, such as a magnetic disk or tape, optical disk, hard disk, flash memory, or other storage media as is known in the art.

In the context of FIGS. 5, 6 and 7 the method may be implemented, for example, by operating portion(s) of the wireless network 14 to execute a sequence of machine-readable instructions, such as wireless device computer platform 50, the billing computer 30, and third party application download server 16. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system comprising:
a wireless network;
at least one computer device, each in selective communication with said wireless network, each computer device for supporting a billable transaction, each computer device having an associated first key identifying the billable transaction;
at least one wireless device, each in selective communication with said wireless network, each of said wireless devices comprising a computer platform having an associated second key identifying the wireless device, each said wireless device capable of conducting a billable transaction with said one of said computer devices over said wireless network, said billable transaction generating an authenticable transaction event data on said wireless network; and
at least one billing computer in selective communication with the wireless network and gathering at least some of the authenticatable transaction event data for the wireless devices, each for authenticating and aggregating the authenticated transaction event data into transaction event billing data such that each transaction event is billable to the specific wireless device that effected that transaction event;
wherein said authenticable transaction event data comprises said first and second keys.

2. The system of claim 1, further comprising:
a wireless service provider that provides access for the wireless devices to the wireless network;
wherein each wireless device has a subscriber that is billed by the wireless service provider for the access of the wireless computer device to the wireless network.

3. The system of claim 2, wherein the billing computer further generates a bill to the subscriber of each wireless computer device.

4. The system of claim 2, wherein the billing computer further transmits the transaction event billing data to a service provider.

5. The system of claim 1, wherein a transaction event is the download of an application to the wireless device from one of the computer devices across the wireless network.

6. The system of claim 1, wherein a transaction event is the subscription to a service provided by one or more computer devices to the wireless device across the wireless network.

7. The system of claim 1, wherein the authenticatable transaction event data is sent to the billing computer at the time of the transaction event occurrence.

8. The system of claim 1, further comprising: one or more application download servers on the wireless network that selectively download applications to the one or more wireless devices; wherein the authenticatable transaction event data is stored at the application download server and then transmitted to the billing computer.

9. The system of claim 1, wherein said second key is a digital signature associated with said wireless device.

10. A method for utilizing authenticated transaction data to generate billing for wireless devices conducting transactions across a wireless network comprising:
receiving transaction event data from one or more wireless devices;
authenticating the transaction event data; and
aggregating the authenticated transaction event data into transaction event billing data such that each transaction event is billable to the specific wireless device that effected that transaction event;
wherein
said transaction event data is caused by one or more billable transaction events caused by a wireless device interacting with a computer device over the wireless network;
each of said billable transaction events generating an authenticatable transaction event data that can verify that the specific wireless device has performed the specific billable transaction event, and
each authenticable transaction event data comprises:
a first key from the computer device participating in the billable transaction event, and
a second key from the specific wireless device,
the first key identifying the billable transaction and the second key identifying the specific wireless device.

11. The method of claim 10, wherein the step of aggregating the authenticatable transaction event data occurs at a billing computer in selective communication with the wireless network.

12. The method of claim 10, wherein a service provider provides access of the wireless computer device to the wireless network, and each wireless device has a subscriber, and further comprising the step of billing the wireless device subscriber for the transaction events caused by the wireless device.

13. The method of claim 12, further comprising:
generating a bill to the subscriber of each wireless device based upon the authenticated and aggregated transaction event data.

14. The method of claim 12, further comprising:
generating transaction event billing data based upon the authenticated transaction event data, and transmitting the transaction event billing data to a wireless service provider.

15. The method of claim 10, wherein the step of causing a billable transaction event is downloading an application to the wireless device from another computer device across the wireless network.

16. The method of claim 15, wherein the step of generating authenticatable transaction event data is generating authenticatable transaction event data from the downloaded application.

17. The method of claim 10, wherein step of causing a billable transaction event is effecting a subscription to a service provided by one or more computer devices to the wireless device across the wireless network.

18. The method of claim 10, wherein the step of aggregating the authenticated transaction event data into transaction event billing data occurs at the time of the transaction event occurrence.

19. The method of claim 10, further comprising: storing the authenticatable transaction event data, and transmitting the stored authenticatable transaction event data to another computer device on the network.

20. The method of claim 10, wherein said second key is a digital signature associated with said wireless device.

21. A computer-readable medium storing instructions that, when executed by a computer on a wireless network causes the computer to utilize authenticated transaction data to generate billing for wireless devices conducting transactions across a wireless network through performing the steps of:
    receiving authenticatable transaction event data that is created from wireless devices interacting with other computer devices across the wireless network, the authenticatable transaction event authentication data usable to verify that a specific wireless device has performed a specific transaction event;
    authenticating the transaction event data; and
    aggregating the authenticated transaction event data into transaction event billing data such that each transaction event is billable to the specific wireless device that effected one or more transaction events;
    wherein said authenticable transaction event data comprises:
        a first key from the computer device participating in the billable transaction event, and
        a second key from the specific wireless device,
        the first key identifying the billable transaction and the second key identifying the specific wireless device.

22. The medium of claim 21, wherein a service provider provides access of the wireless computer device to the wireless network, and each wireless device has a subscriber therefor, and which causes the computer to further perform the step of billing the wireless device subscriber for the transaction events caused by the wireless device.

23. The medium of claim 22, wherein said instructions further cause the computer to perform the step of generating a bill to the subscriber of each wireless device based upon the authenticated and aggregated transaction event data.

24. The medium of claim 22, wherein said instructions further cause the computer to perform the step of transmitting the transaction event billing data to a service provider.

25. The medium of claim 21, wherein said second key is a digital signature associated with said wireless device.

26. A wireless device in selective communication with other computer devices across a wireless network, the wireless device including a computer platform and able to conduct billable transactions with other computer devices across the wireless network, and a billable transaction causing transaction event authenticatable data to be generated which verifies that the wireless device has performed a specific transaction event, and the wireless device further selectively transmitting the authenticatable transaction event data to one or more computer devices on the wireless network;
    wherein
    a transaction event is the download of an application to the wireless device from another computer device across the wireless network,
    the application includes a secure first key identifying the application, and the device further includes a second key identifying the wireless device, and upon download of the application, the first and second keys form the authenticatable transaction event data.

27. The device of claim 26, wherein the device selectively transmits the authenticatable transaction event data to a wireless service provider that provides access of that wireless computer device to the wireless network.

28. The device of claim 26, wherein the device selectively transmits the authenticatable transaction event data at the time of the billable transaction.

29. The device of claim 26, wherein the device stores the authenticatable transaction event data and then selectively transmits the stored authenticatable transaction event data to another computer device on the wireless network.

30. The device of claim 26, wherein said second key is a digital signature associated with said wireless device.

31. A method for generating authenticatable transaction data at a wireless device conducting transactions across a wireless network with a computer device comprising:
    interacting with the computer device across the wireless network to cause a billable transaction event;
    generating authenticatable transaction event data that can verify that the specific device has performed the specific billable transaction event, said authenticatable transaction event data comprising a first key associated with the billable transaction event received from the computer device, and a second key identifying the wireless device; and
    selectively transmitting the authenticatable transaction event data to a billing device in selective communication with the wireless network.

32. The method of claim 31, wherein the device transmits the authenticatable transaction event data to a wireless service provider for that device.

33. The method of claim 31, wherein the step of causing a billable transaction event is downloading an application to the wireless device from the computer device.

34. The method of claim 31, wherein step of causing a billable transaction event is effecting a subscription to a service provided by the computer devices to the wireless device.

35. The method of claim 31, wherein the step of transmitting the authenticated transaction event data occurs at the time of the billable transaction event occurrence.

36. The method of claim 35, further comprising:
    storing the authenticatable transaction event data, and then selectively transmitting the stored authenticatable transaction event data to another computer device on the network.

37. The method of claim 31, wherein said second key is a digital signature associated with said wireless device.

* * * * *